Figure 1:
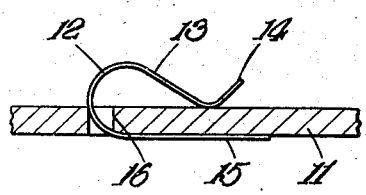

March 14, 1939.  E. B. FERNBERG  2,150,497
FASTENER
Filed May 1, 1937  3 Sheets-Sheet 1

Inventor
E. B. FERNBERG.
per John P. Tarbox
Attorney

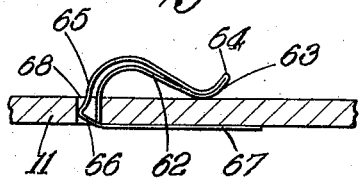
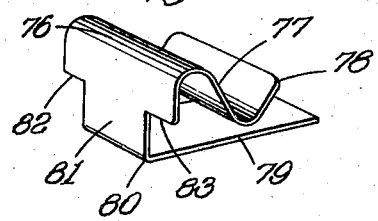
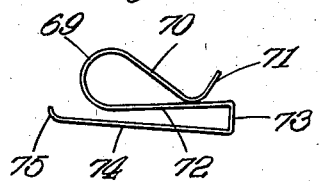
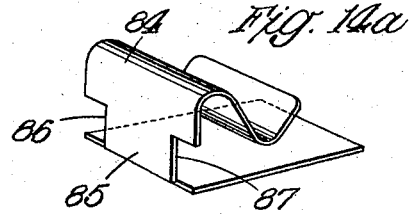
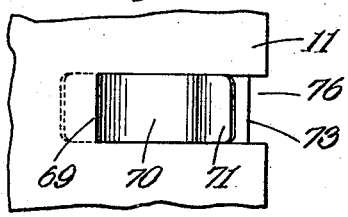
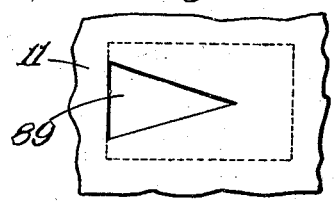
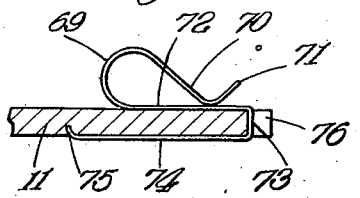
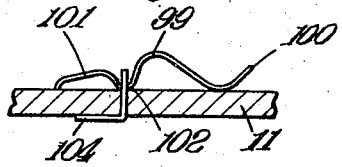
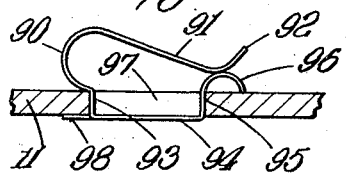
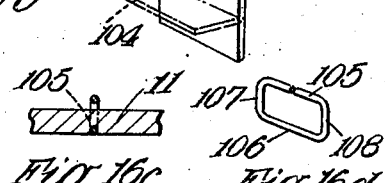

March 14, 1939.  E. B. FERNBERG  2,150,497
FASTENER
Filed May 1, 1937  3 Sheets-Sheet 3
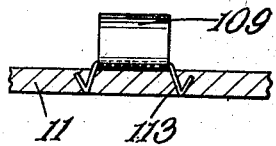
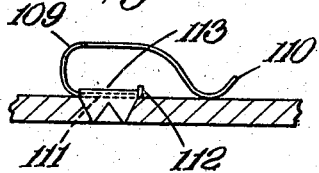
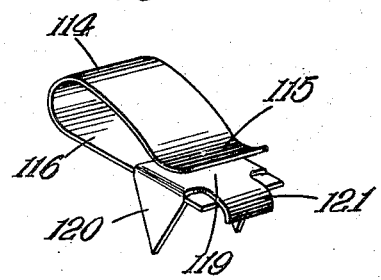
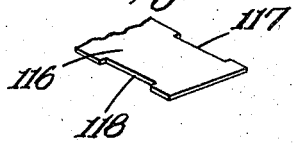
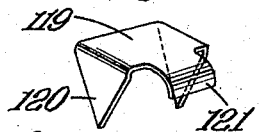
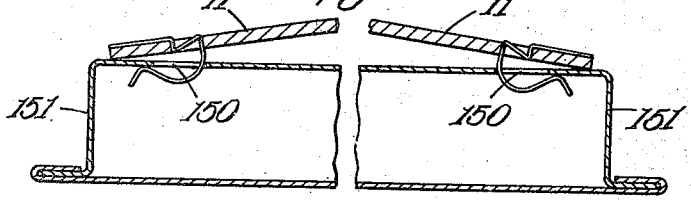
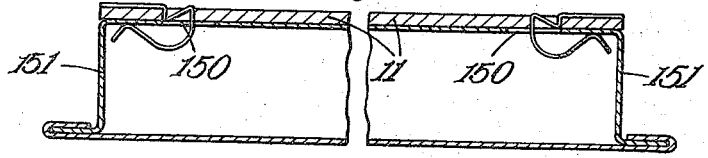
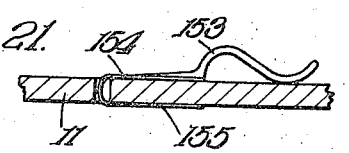
Inventor
E. B. Fernberg
per John R. Darby
Attorney Patented Mar. 14, 1939

2,150,497

UNITED STATES PATENT OFFICE 2,150,497

FASTENER

Eric Birger Fernberg, Pinner, England

Application May 1, 1937, Serial No. 140,114
In Great Britain September 11, 1936

2 Claims. (Cl. 24—259)

This invention relates to fastening means and concerns particularly a fastener for the attachment of pads or panels such as trim pads, for the trimming, for example, of vehicle bodies, to sheet metal or like panels or pillars or other foundation structures of metal or wood.

The object of the invention is to provide a simple, cheap and reliable fastener.

According to the present invention a pad or like member is attached to a panel or other foundation structure which it is desired to trim or upholster, by means of a clip member, or a series of such clips, detachably secured to the pad and capable of embracing an edge of the panel or other structure to hold the pad firmly thereagainst.

Preferably the pad should possess a certain degree of resiliency so that it is capable of being bowed to bring the clips into a position such that they may embrace the edge of the panel.

Clips according to the invention may be secured along opposite margins of a pad, but spaced somewhat from the edges thereof, so that when the pad is sprung into position, it will have a margin coinciding with the margins of the panel.

In the case, for example, of a sheet metal vehicle door comprised of inner and outer stampings, the inner stamping, in that area which is covered by a trimmed pad, would be formed with a series of slots or be cut away but to a somewhat less extent than the area of the pad, to present an inwardly directed edge or edges to be embraced by the clips, the margins of the pad overlapping and covering the margins of the panel around the aperture therein.

The clip itself may take the form of a strip of tempered steel or other spring material, bent to substantially elongated U-form, one limb of which is formed or flared away from the other providing a lip to facilitate its engagement with the edge of a panel. The other limb being straight in considerable part serves for attachment to a pad, which may simply be slotted and the straight limb of the U-clip threaded into the slot so that it lies flush with the outer surface of the pad, the other limb then lying closely adjacent the inner surface with its end directed away from the pad to present an open mouth or flared opening for engagement with the edge of a panel.

In an alternative construction the clip may be in two portions, the one formed with a bend at on end, and apertured in the bent portion to retain the clip proper which may be urged to bear against the first portion or against the pad when in position.

Normally a series of clips would be arranged along opposite margins of a pad with their open flared ends directed towards its edge and of such a distance apart that they correspond with the apertures or slots formed for example in an inner door stamping, and in order that these clips shall be caused to engage the edges of said aperture or slots the pad is bowed to bring the clips nearer together in a direct line. Then by guiding the flared mouths of the clips over the edges of the panel and allowing the pad to resume its normal position the clips embrace said edges and hold the pad in a definite relation with respect to the panel.

To facilitate the assembly of the clip to the pad where it might be found necessary to open out the limbs of the U, one limb may be apertured or punched for co-operation with a suitable tool.

Instead of employing tempered steel strip for the clip, wire may equally well be used, in which case, a length of wire would be bent to the form of a double U, with the limbs spaced apart or alternatively non-spring metal, or even compressed fibre may be employed.

The pad is preferably simply formed with a series of slits or nicks and the clips threaded into them.

The usual procedure in mounting trim-pads carrying clips according to the invention, will be to arrange a plurality of clips along opposite edges of the pad, or if desired a third series may be arranged along the bottom edge of a pad, in which case provision must be made in a panel to allow the pad to be moved down bodily, after the side clips are in position, so that the bottom clips engage the lower edge of the panel.

The arrangement is simple and cheap, and no great skill or accuracy is required in the fitting of the clips to the pads or in mounting the pads on the panels.

The invention is illustrated in the accompanying drawings of which Figures 1 to 11 are side views of several modifications of the clip showing the trim pad in section; Figures 12a, 12b and 12c show a further modification of clip, the form of slot in the pad, and the clip assembled to the pad respectively; Figure 13 is a perspective view of a further modification of clip; Figures 14a, 14b are respectively a perspective view of yet a further modification and a plan view of a trim pad showing the slot for insertion of the clip; Figure 15 is a view similar to Figures 1 to 11 of yet a further modification; Figures 16a and 16b show respectively the assembly of a clip formed in two portions and a perspective view of the retainer portion, whilst Figures 16c and 16d show the assembly and a perspective view of a wire retainer respectively; Figures 17a and 17b are end and side views respectively of a further modification of the clip formed in two portions; Figures 18a, 18b and 18c are perspective views of a further modification of a clip and retainer, the clip by itself and the retainer by itself respectively. Figures 19 and 20 are sectional views showing two stages in the assembly of a trim pad to a sheet metal panel and Figure 21 is a view similar to Figure 1 of a further modification of clip.

In the accompanying drawings the trim pad is designated throughout by the numeral 11.

According to Figure 1 which shows the simplest possible type of clip, a strip of tempered spring steel 12 is bent to substantially U form the one limb being formed to approach the other limb as at 13, its free end being turned outwardly forming a lip as at 14 to facilitate engagement with the edge of a panel (not shown). The outer limb 15 is substantially straight and when the clip has been threaded through the aperture 16 punched in the trim pad 11 the limb 15 bears against the outside face of said trim pad, to which the upholstery is attached, but is not shown in the drawings.

Figure 2:
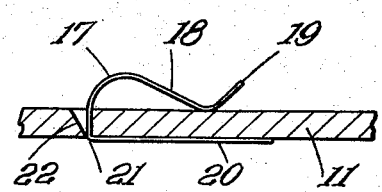

In Figure 2 the strip 17 of tempered spring steel is bent to substantially U form, the one limb being shaped as at 18, 19, to correspond with the shape 13, 14 of the clip of Figure 1, but the limb 20 extends from the portion 17 at a sharp angle indicated at 21. The clip is threaded through a nick 22 in the trim pad 11 and due to the square corner 21 the clip lies flat and snugly against the trim pad.

Figure 3:
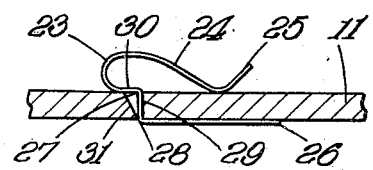

According to Figure 3 a strip of tempered spring steel 23 is formed with two limbs the one limb 24, 25 corresponding substantially with the limb 13, 14 of the clip of Figure 1. The other limb 26 extends from the strip 23 through the double bent portion 27, 28, the portion 29 between the corners 27, 28 being at right angles to the limb 26 and of a length corresponding with the thickness of the trim pad 11; whilst the portion 30 extends for a distance substantially parallel with the limb 26 before merging into the other limb 14 and provides a stop and location for the clip. In this case also the clip is threaded through a nick 31 in the trim pad 11, the configuration of the clip at the base of its substantially U form ensuring that the clip cannot be moved within the pad at its point of fixing.

Figure 4:
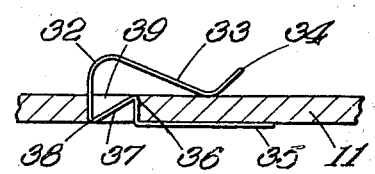

In Figure 4 is shown a modification of the clip of Figure 2, the strip 32 is bent to present two limbs, the one 33, 34 corresponding with the limb 14, 14 of the clip of Figure 1, but in this case the clip is attached to the pad in a square or rectangular hole. The limb 35 rests against the outer face of the pad and before merging with the limb 33 is formed with a portion 36 at right angles to the limb 35 of a length equal to the thickness of the pad, a diagonal portion 37 extending downwardly to substantially the plane of the limb 35 and then bent sharply back at 38 to merge with the limb 33. The portions 36, 36a and 37 of the clip serve readily to locate it within the square or rectangular hole 39 and to hold it therein against undesirable movement.

Figure 5:
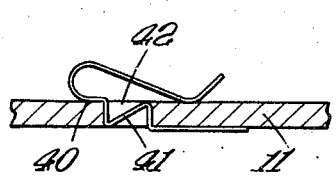
Figure 6:
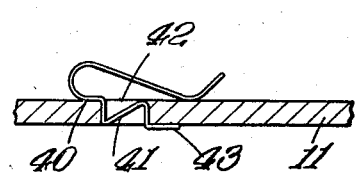

In Figure 5 is shown a clip embodying the form of Figures 3 and 4. The flat portion or stop 40 engaging the inside face of the pad and the Z section portion 41 fitting snugly within the hole 42 of the pad 11, whilst the clip of Figure 6 corresponds with that of Figure 5 with the exception that the outer limb 43 is in the form of a short lip engaging the outside face of the pad.

Figure 7:
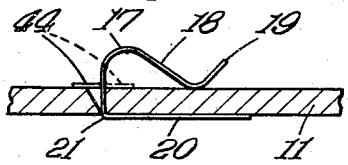

Figure 7 shows a modification of a clip according to Figure 2 in which a lug or tag 44 is punched out from the spring 17 to bear against the inside face of the trim pad 11 serving as a means of locating the clip and as a stop therefor. The lug 44 may be punched in either of the directions shown in the full or dotted lines.

Figure 8:
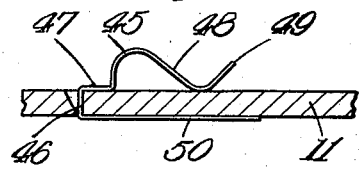

According to Figure 8 the clip 45 is formed in its base of square section U form, the base 46 being of a length equal to the thickness of the pad 11, the limb 47 being formed as at 48, 49 to correspond with the limb 13, 14 of the clip of Figure 1, whilst the other straight limb 50 bears against the outside face of the pad. At its base, therefore, the clip according to Figure 8 embraces the pad snugly, both on its inside and outside faces.

Figure 9:
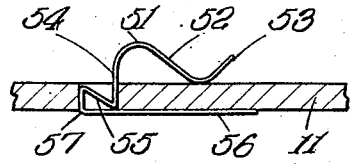

In Figure 9 is shown a modification of Figure 4 which modification lies more or less in the geometry of the clip. Here the clip 51 is formed with the limb 52, 53 corresponding with the limb 13, 14 of the clip of Figure 1, and the base 54 has the Z form 55 extending away from the lip 53 of the clip. The other limb 56 rests against the outside face of the trim pad 11 as in the case of Figures 4, 5 and 6. This clip must be assembled in a square or rectangular hole 57 in the trim pad and the Z configuration 55 locates the clip positively in the hole 57 by engagement of the sides 54 and 56a with the edges of the hole and prevents it from moving therein.

Figure 10:
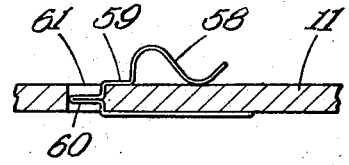

Figure 10 is a modification of Figure 8 showing a method of locating a clip in a hole punched in the trim pad 11. The clip 58 in its square U base 59 is bent back on itself as at 60 to present a tongue directed away from the point of engagement of the clip with a panel, which tongue nests within the hole 61 punched in the trim pad 11.

In Figure 11 is shown a modification of the clip of Figure 2 in which the limb 62, 63 corresponding with the limb 13, 14 of the clip of Figure 1 is bent back on itself at 64 to present a double portion for engagement with the edge of a panel, the free end 65 of the bent back portion is inturned at 66 to abut against the outer limb 67 and to locate and to provide a degree of spring tension to hold the clip in the hole 68 in the trim pad 11.

In cases where it is not convenient to punch holes in the pad or to form nicks therein but where it is permissible to form a small cut-out in the edge of the pad the clip according to Figure 12a may be used. Here the spring 69 is formed with the limb 70, 71 corresponding with the limb 13, 14 of the clip of Figure 1. The other limb 72 in this case is arranged to lie on the inside face of the trim pad 11 and at its end is formed with a right angled portion 73 of a length equal to the thickness of the trim pad and a turned back portion 74 arranged to lie against the outside face of the trim pad, its end being turned up as at 75 to be pressed into the pad. The pad 11 is formed with a notch 76 which is embraced by the portion 73 of the spring 69, as shown clearly in Figure 12c. In the assembly of this clip the turned up portion 75 further assists the mounting of the clip on the pad.

According to Figure 13 which is a modification of the clip of Figure 2 the spring 76 is bent to present a limb 77, 78, corresponding with the limb 13, 14 of the clip of Figure 1, the other limb 79 projecting from the square bend 80 but in this case the flat vertical portion 81 at the base of the U clip is formed with shoulders 82, 83, or in other words the limb 79 is of less width than the limb 77, 78, so that when in position in the pad the shoulders 82, 83 bear against the inside face of the pad and form a positive stop for the clip.

Figure 14a shows a modification of Figure 13 in which the spring 84 in its vertical flat portion 85 is formed with rectangular recesses 86, 87, which recesses engage positively the aperture formed in the pad 11, and to enable this clip to be assembled to the pad 11 it is necessary to provide a triangular slot 89, in the pad (see Figure 14b) the clip being inserted in the slot in a direction having the greatest dimension and then turned until the recesses 86, 87 engage the pad firmly.

In order to facilitate the engagement of the lip of a clip according to this invention with the edge of a steel panel it may be necessary to provide a "lead-in" and one such form of clip embodying this lead-in is shown in Figure 15. The clip 90 as before is formed with the limb 91, 92, the base of the spring 90 is bent as at 93 to present a length equal to the thickness of the pad then bent at right angles thereto to present the portion 94, the end of the portion 94 being bent backwardly at 95 and terminating in the downturned lip portion 96 lying adjacent the lip 92. The lips 92 and 96 present a flared mouth for engagement with the edge of a metal panel. The pad 11 is punched with an aperture 97 of a size corresponding with the length of the portion 94 of the clip which is retained in position on the pad by means of the punched out tongue or tag 98.

The foregoing embodiments comprise a clip made from a single strip of tempered spring steel but in the following embodiments is described a clip according to the invention comprised of two portions. According to Figures 16a and 16b the clip proper comprises a spring 99 having an end lip 100 the other end projecting rearwardly at 101 and adapted to bear against the inside face of the trim pad 11. The depression 102 in the spring 99 is formed to engage a slot 103 formed in an angular retainer 104. The spring is first threaded through the slot 103 and then the retainer 104 is threaded through the slot in the trim pad 11 and bent over. As a modification of the immediately foregoing embodiment the retainer of Figures 16c and 16d may be employed. Here the retainer is in the form of a wire clip 105 bent firstly to U form, the base of the U 106 engaging the notch 102 of the spring 99, the limbs 107 and 108 passing through suitably punched holes in the trim pad 11, the ends of the U shape wire being then bent over to hold the spring 99 in position. If desired the wire retainer may be inserted in the reverse manner or a staple may be staked into the pad.

In the modification of Figures 17a and 17b there is shown a clip which does not require threading through the trim pad 11. Here the spring 109 formed with a lip 110 as before has a short portion 111 arranged to lie on the inside face of the trim pad 11 and is formed at its end with an upturned portion 112 serving to locate a spiked retainer 113 which is adapted to be driven firmly into the trim pad 11.

The advantage of the clip of Figure 15 may be attained also when the clip is formed in two portions and such an arrangement is shown in Figures 18a to 18c. The spring 114 is formed with a lip 115 as before and is arranged with its limb 116 to lie on the inside face of the trim pad. Adjacent the free end of the limb 116 are formed recesses 117, 118 (Figure 18b), with which recesses co-operate with a retainer 119, formed with spiked legs 120 arranged to be driven into the pad and having a lip portion 121 lying closely adjacent the lip 115 to present a flared mouth for engagement with the edge of the steel panel.

Figures 19 and 20 show respectively the first position of a trim pad 11, carrying a plurality of clips and upholstered, bowed to permit the clips to engage slots 150 formed in the sheet metal panel 151 and the second position, with the trim pad sprung into place. Figure 21 shows a form of clip made from wire 153, swaged flat at one end as at 154, which end is adapted to be threaded through the trim pad 11 and be turned over at 155.

It is to be observed that in some instances the limb of the clip lying against the outer face of the pad is longer than the formed limb in order to facilitate the assembly or threading of the clip to or in the pad.

The foregoing describes several modifications of a spring clip according to the invention and it is to be understood that none of the foregoing embodiments are given by way of limitation of the invention but as examples only, and that the invention is capable of yet further modification.

I claim:

1. A fastener device for trim pads or the like comprising a unitary member of tempered spring steel bent into generally U-form as viewed in side elevation, one leg of the U forming a base portion whereby the member may be secured to a pad and the other leg of the U forming a clamping portion whereby a pad equipped with the device may be secured to a foundation structure, said base portion having a flat end portion and a Z-section portion in extension of said end portion, the arms of the Z extending substantially normal to the plane of the end portion and providing shoulders, the clamping portion being an extension of said Z-section portion at the end thereof remote from its merger with the flat end portion and having its free end formed with an outturned tip.

2. A fastener device according to claim 1 in which the Z-section portion where it merges with the clamping portion is formed with a seating extension parallel to the free end portion of the base portion but offset from the plane thereof.

ERIC BIRGER FERNBERG.